(12) United States Patent
Taneda et al.

(10) Patent No.: US 7,684,836 B2
(45) Date of Patent: Mar. 23, 2010

(54) PORTABLE TERMINAL DEVICE OF THE FOLDABLE TYPE

(75) Inventors: Minoru Taneda, Higashiosaka (JP); Motoaki Mushika, Hashima (JP)

(73) Assignee: Kyocera Corporation, Kyoto (JP)

( * ) Notice: Subject to any disclaimer, the term of this patent is extended or adjusted under 35 U.S.C. 154(b) by 79 days.

(21) Appl. No.: 10/689,537

(22) Filed: Oct. 21, 2003

(65) Prior Publication Data

US 2004/0132513 A1 Jul. 8, 2004

(30) Foreign Application Priority Data

Oct. 21, 2002 (JP) .............................. 2002-305846

(51) Int. Cl.
*H04M 1/00* (2006.01)
*H04M 9/00* (2006.01)

(52) U.S. Cl. ................................ 455/575.3; 379/433.13

(58) Field of Classification Search ............. 455/575.1, 455/575.3, 550.1, 90, 90.1, 90.3, 433.13, 455/575; 379/433.13, 368; 348/376; 361/814, 361/807; 439/164
See application file for complete search history.

(56) References Cited

U.S. PATENT DOCUMENTS

| | | | | |
|---|---|---|---|---|
| 6,011,699 | A * | 1/2000 | Murray et al. ............... | 361/814 |
| 6,421,547 | B1 * | 7/2002 | Frohlund et al. .......... | 455/575.3 |
| 6,470,175 | B1 * | 10/2002 | Park et al. ................... | 455/90.1 |
| 6,633,749 | B2 * | 10/2003 | Kubo et al. ................. | 455/90.3 |
| 6,704,586 | B2 * | 3/2004 | Park .......................... | 455/575.3 |
| 6,751,488 | B2 * | 6/2004 | Lee .......................... | 455/575.3 |
| 6,754,507 | B2 * | 6/2004 | Takagi ...................... | 455/550.1 |
| 6,914,982 | B2 * | 7/2005 | Toyoda et al. .......... | 379/433.13 |
| 6,965,413 | B2 * | 11/2005 | Wada ......................... | 348/376 |
| 6,975,724 | B2 * | 12/2005 | Shin ....................... | 379/433.13 |
| 7,058,176 | B2 * | 6/2006 | Chen et al. ............. | 379/433.13 |
| 2001/0051510 | A1 * | 12/2001 | Nakamura ................... | 455/90 |
| 2002/0016182 | A1 * | 2/2002 | Kubo et al. ................. | 455/550 |
| 2002/0042252 | A1 * | 4/2002 | Toyoda et al. ................ | 455/90 |
| 2002/0045370 | A1 * | 4/2002 | Koch-Osborne ............ | 439/164 |
| 2002/0072335 | A1 * | 6/2002 | Watanabe .................... | 455/90 |
| 2002/0173281 | A1 * | 11/2002 | Kobayashi .................. | 455/90 |
| 2003/0027590 | A1 * | 2/2003 | Nakamura et al. .......... | 455/550 |
| 2004/0023684 | A1 * | 2/2004 | Sato et al. ................. | 455/550.1 |
| 2004/0248625 | A1 * | 12/2004 | Yoshida et al. ........... | 455/575.1 |

FOREIGN PATENT DOCUMENTS

| | | |
|---|---|---|
| JP | 2000-253124 | 9/2000 |
| JP | 2001-298516 | 10/2001 |
| JP | 2001-320464 | 11/2001 |
| JP | 2002-16378 | 1/2002 |

* cited by examiner

*Primary Examiner*—Charles N Appiah
*Assistant Examiner*—Kiet Doan
(74) *Attorney, Agent, or Firm*—Morrison & Foerster LLP

(57) ABSTRACT

The invention provides a portable terminal device of the foldable type wherein a manipulation-side cabinet and a display-side cabinet each comprises a front cabinet segment and a rear cabinet segment joined thereto. The manipulation-side cabinet has its front cabinet segment connected at an end portion thereof to a hinge mechanism and has its rear cabinet segment engaged with the front cabinet segment thereof. The display-side cabinet has its rear cabinet segment connected at an end portion thereof to the hinge mechanism and has its front cabinet segment engaged with the rear cabinet segment thereof.

4 Claims, 12 Drawing Sheets

PORTABLE TERMINAL DEVICE OF THE FOLDABLE TYPE

FIELD OF THE INVENTION

The present invention relates to portable terminal devices of the foldable type which comprise a pair of flat cabinets openably connected to each other by a hinge mechanism.

BACKGROUND OF THE INVENTION

Conventional portable telephones of the foldable type comprise a manipulation-side cabinet 10 and a display side cabinet 20 which are connected to each other by a hinge mechanism 30 as shown in FIG. 10 (see JP-A No. 2000-253124, JP-A No. 2001-298516 and JP-A No. 2001-320464). The manipulation-side cabinet 10 comprises a rear cabinet half segment 40 and a front cabinet half segment 50 joined thereto, and a plurality of manual keys are arranged on the front cabinet segment 50. The display-side cabinet 20 comprises a front cabinet half segment 60 and a rear cabinet half segment 70 joined thereto, and the front cabinet segment 60 is provided with a display.

The front cabinet segment 50 of the manipulation-side cabinet 10 is provided with an opposed pair of first annular piece 56 and second annular piece 57 projecting from one end thereof. The front cabinet segment 60 of the display-side cabinet 20 is provided with an opposed pair of first annular piece 66 and second annular piece 67.

The first annular piece 56 of the manipulation-side cabinet 10 and the first annular piece 66 of the display-side cabinet 20 are arranged side by side in contact with each other and have fitted in the interior thereof a hinge unit (not shown) providing the hinge mechanism 30. Further the second annular piece 57 of the manipulation-side cabinet 10 and the second annular piece 67 of the display-side cabinet 20 are arranged side by side in contact with each other and have fitted in the interior thereof a hinge unit (not shown) providing the hinge mechanism 30.

The front cabinet segment 50 of the manipulation-side cabinet 10 is provided with a projecting circular-arc piece 58 positioned between the first and second annular pieces 56, 57, while the rear cabinet segment 40 is provided with a partial member 46 joined to the circular-arc piece 58 for forming a hollow cylinder. The front cabinet segment 60 of the display-side cabinet 20 is provided with a projecting circular-arc piece 68, while the rear cabinet segment 70 is provided with a partial member 74 joined to the circular-arc piece 68 for forming a hollow cylinder.

With reference to FIG. 11, a circuit board 13 mounted on the front cabinet segment 50 of the manipulation-side cabinet is electrically connected to a display 25 mounted on the front cabinet segment 60 of the display-side cabinet by a flexible lead 80. The flexible lead 80 is helically wound inside the hollow cylinders provided between the first and second annular pieces 66, 67, whereby the flexible lead 80 is allowed to deform with the opening or closing of the manipulation-side cabinet and display-side cabinet (see FIG. 12).

With the portable telephone of the foldable type shown in FIG. 10, however, it may be attempted to forcibly close the manipulation-side cabinet 10 and the display-side cabinet 20 with extraneous matter held between the two cabinets 10, 20. In such a case, a force acting to move the two cabinets 10, 20 away from the hinge mechanism 30, i.e., a spreading force, will act on the cabinets with the extraneous matter serving as a fulcrum.

The front cabinet segment 50 of the manipulation-side cabinet 10 and the front cabinet segment 60 of the display-side cabinet 20 are attached directly to the hinge mechanism 30, whereas the rear cabinet segment 40 of the manipulation-side cabinet and the rear cabinet segment 70 of the display side cabinet 20 are merely fastened with screws at several locations, in engagement with the respective front cabinet segments 50, 60 and are not joined to the hinge mechanism 30. This results in the problem that the spreading force acts to create a clearance especially at the joint A between the front cabinet segment 60 and the rear cabinet segment 70 of the display-side cabinet 20.

Further if the rear cabinet segments of the two cabinets are merely removed as shown in FIGS. 11 and 12 in the case where the hinge mechanism 30 is to be removed for the maintenance of the telephone, the flexible lead 80 is exposed as bulged outward between the first annular piece 66 and the second annular piece 67 of the front cabinet segment 60 of the display-side cabinet. It is therefore impossible to insert a removing jig into the hinge mechanism 30 because the flexible lead 80 will interfere with the jig. Accordingly, there is a need to remove the display 25 from the front cabinet segment 60 on the display side and the circuit board 13 from the front cabinet segment 50 on the manipulation side if the hinge mechanism 30 is to be removed, hence the problem of cumbersome work.

SUMMARY OF THE INVENTION

Accordingly, a first object of the present invention is to provide a portable terminal device of the foldable type which comprises a manipulation-side cabinet and a display-side cabinet and wherein no clearance is created at the joint between a front cabinet segment and a rear cabinet segment when an attempt is made to forcibly close the two cabinets with extraneous matter held therebetween.

A second object of the present invention is to provide a portable terminal device of the foldable type wherein a manipulation-side cabinet and a display-side cabinet are connected together by a hinge mechanism, which can be removed more easily than in the prior art.

The present invention provides a portable terminal device of the foldable type which comprises a pair of flat cabinets openably connected to each other by a hinge mechanism. Each of the cabinets comprises a front cabinet segment to be opposed to the other cabinet when closed and a rear cabinet segment joined to the front cabinet segment.

One of the pair of cabinets has its front cabinet segment connected at an end portion thereof to the hinge mechanism and has its rear cabinet segment engaged with the front cabinet segment thereof. The other cabinet has its rear cabinet segment connected at an end portion thereof to the hinge mechanism and has its front cabinet segment engaged with the rear cabinet segment thereof.

Stated more specifically, one of the pair of flat cabinets is a manipulation-side cabinet 1 provided with a plurality of manual keys, and the other cabinet is a display-side cabinet 2 provided with a display, the front cabinet segment 5 of the manipulation-side cabinet 1 and the rear cabinet segment 7 of the display-side cabinet 2 being connected to each other by the hinge mechanism 3.

With the portable terminal device of the present invention, the front cabinet segment 5 of the manipulation-side cabinet 1 and the rear cabinet segment 7 of the display-side cabinet 2 are connected to each other, so that when the two cabinets 1, 2 are to be closed with extraneous matter held therebetween, at least the front cabinet segment 6 of the display-side cabinet 2 is not subjected to a spreading force acting to move the segment 6 away from the rear cabinet segment 7. This obviates the likelihood that a clearance will be created at the joint between the segments 6 and 7 of the display-side cabinet 2.

On the other hand, the rear cabinet segment 4 of the manipulation-side cabinet 1 is subjected to a spreading force acting to move the segment 4 away from the front cabinet segment 5, whereas even if screws 91 are driven into the front segment 5 from outside the rear segment 4, there arises no problem in respect of design. Accordingly, these segments can be fastened with the screws at a position in the closest proximity to the hinge mechanism 3. As a result, there is no likelihood that a clearance will be created at the joint between the segments 4, 5 of the manipulation-side cabinet 1.

Further stated more specifically, the front cabinet segment 5 of the manipulation-side cabinet 1 is provided with a pair of annular pieces 51, 52 projecting from one end thereof and spaced apart from each other, and the rear cabinet segment 7 of the display-side cabinet 2 is provided with a pair of annular pieces 71, 72 projecting from one end thereof and spaced apart from each other, the annular piece 51 of the manipulation-side cabinet 1 and the annular piece 71 of the display-side cabinet 2 being arranged side by side in contact with each other and have fitted therein a first hinge unit 31, the other annular piece 52 of the manipulation-side cabinet 1 and the other annular piece 72 of the display-side cabinet 2 being arranged side by side in contact with each other and have fitted therein a second hinge unit 31.

With this specific construction, the annular piece 51 of the manipulation-side cabinet 1 and the annular piece 71 of the display-side cabinet 2 are connected together by the first hinge unit 31 rotatably relative to each other, while the other annular piece 52 of the manipulation-side cabinet 1 and the other annular piece 72 of the display-side cabinet 2 are connected together and made rotatable relative to each other by the second hinge unit 31. In this way, the two cabinets 1 and 2 are made closable and openable.

Further stated more specifically, the front cabinet segment 5 of the manipulation-side cabinet 1 has a circular-arc piece 53 projecting from the end thereof and positioned between the pair of annular pieces 51, 52, and the rear cabinet segment 4 of the manipulation-side cabinet 1 is provided at one end thereof with a partial member 41 joined to the circular-arc piece 53 for forming a hollow cylinder. The front cabinet segment 6 of the display-side cabinet 2 is provided with a projecting circular-arc piece 62 positioned between the pair of annular pieces 71, 72, and the rear cabinet segment 7 of the display-side cabinet 2 is provided at the end thereof with a partial member 73 joined to the circular-arc piece 62 for forming a hollow cylinder.

With the above specific construction, the partial member 41 is attached as a separate member to the rear cabinet segment 4 of the manipulation-side cabinet 1, so that the segment 4 and the partial member 41 can be given different colors. Since the partial member 73 is attached as a separate member to the rear cabinet segment 7 of the display-side cabinet 2, the segment 7 and the partial member 73 can be colored in different colors. Consequently, in the case where the front cabinet segments 5, 6 and the rear cabinet segments 4, 7 of the two cabinets 1, 2 are to be colored in different colors, the cylindrical portions between the first and second annular pieces 71, 72 projecting from the rear cabinet segment 7 of the display-side cabinet 2 can be given the same color as the front cabinet segments 5, 6.

Further stated more specifically, a circuit board in the manipulation-side cabinet 1 and a display in the display-side cabinet 2 are connected to each other by a flexible lead 8, and the flexible lead 8 is helically wound inside the hollow cylinders formed by the circular-arc pieces and the partial members.

When the front cabinet segment 6 of the display-side cabinet 2 is then removed, with the two cabinets 1 and 2 opened, and if the circular-arc piece 62 on the segment 6 is removed, the inside flexible lead 8 becomes exposed. Because the flexible lead 8 is helically wound along the inner periphery of the partial member 73 of the rear cabinet segment 7, at least one of the hinge units 31 which is fitted in the first annular piece 51 of the cabinet 1 and the first annular piece 71 of the cabinet 2 is exposed without being interfered with by the flexible lead 8. Accordingly, the hinge unit 31 can be removed easily by inserting a removing jig in this state from a position inwardly of the hinge unit 31.

With the portable terminal device of the foldable type described and embodying the invention, a large clearance is unlikely to be produced at the joint between the front cabinet segment and the rear cabinet segment even if an attempt is made to forcibly open the manipulation-side cabinet and the display-side cabinet with extraneous matter held therebetween. Furthermore, the hinge mechanism connecting the two cabinets can be removed more easily than conventionally.

DETAILED DESCRIPTION OF THE EMBODIMENT

Figure 1:
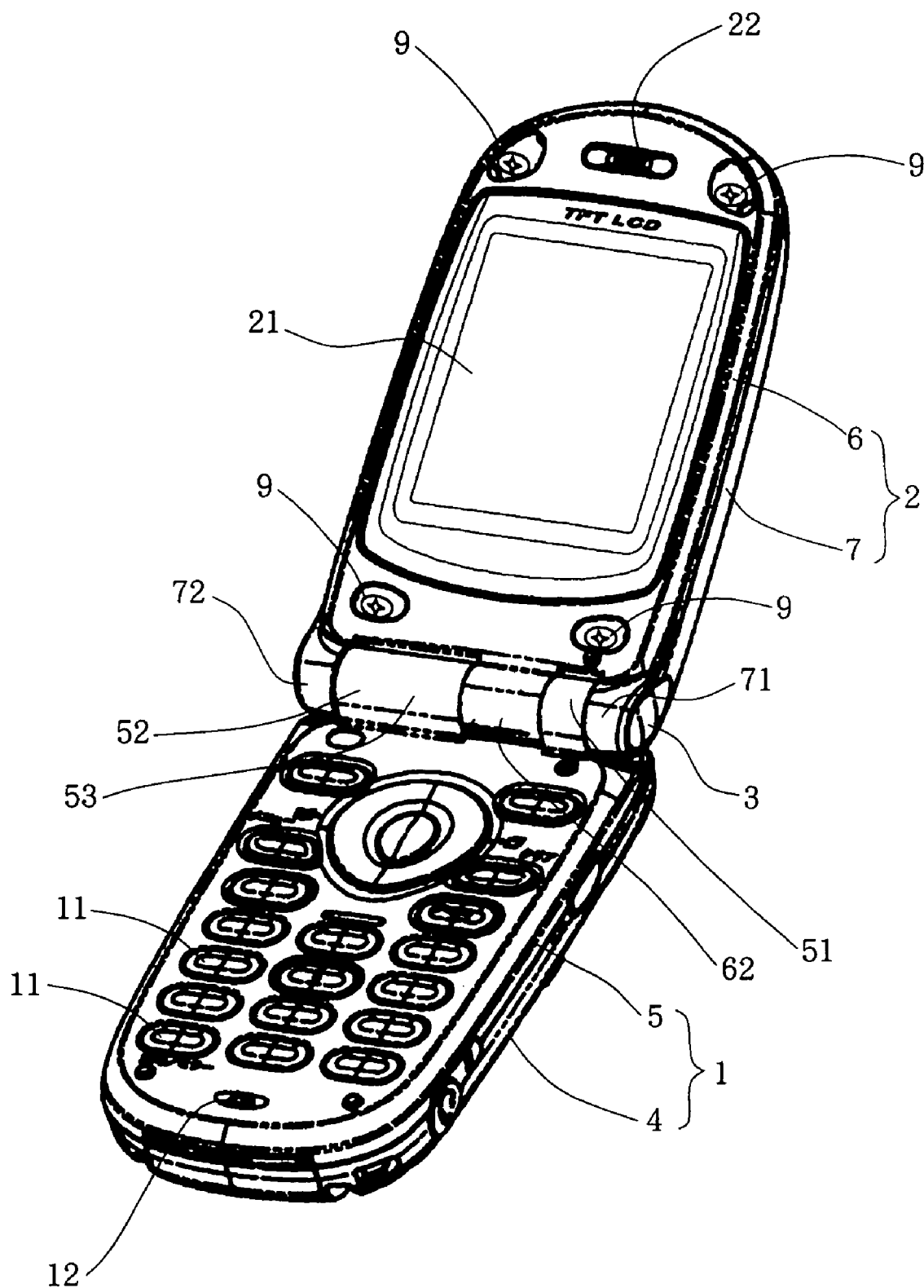
FIG. 1 is a perspective view of a portable telephone of the foldable type according to the invention as it is opened.
Figure 2:
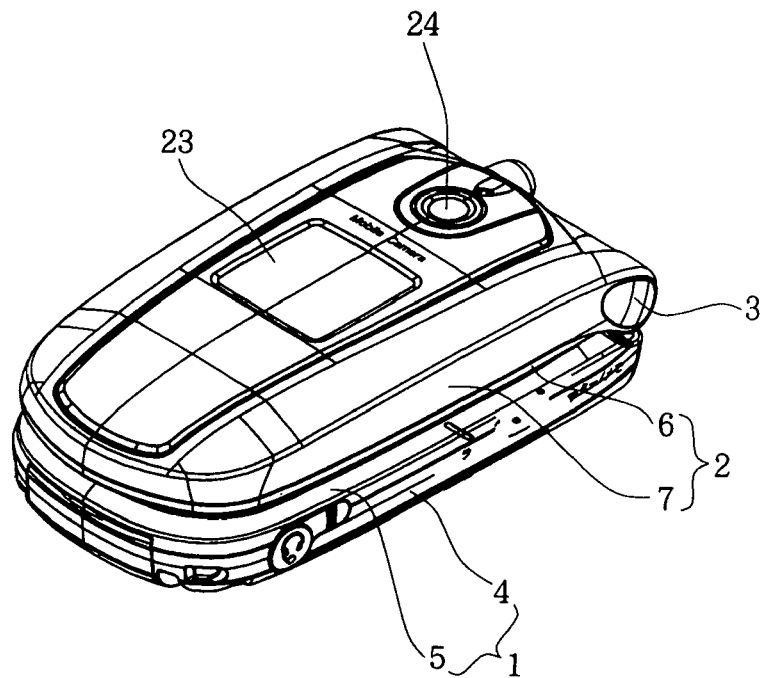
FIG. 2 is a perspective view of the telephone as it is closed.

The present invention as embodied into a portable telephone of the foldable type will be described below in detail with reference to the drawings. As shown in FIG. 1, the portable telephone of the foldable type according to the invention comprises a manipulation-side cabinet 1 and a display-side cabinet 2 which are connected to each other by a hinge mechanism 3. The manipulation-side cabinet 1 comprises a rear cabinet half segment 4 and a front cabinet half segment 5 joined thereto. The manipulation-side cabinet 1 is provided with a plurality of manual keys 11 and a transmitter 12. The display-side cabinet 2 comprises a front cabinet half segment 6 and a rear cabinet half segment 7 joined thereto. The front cabinet 2 is provided with a main display 21 and a receiver 22. A subdisplay 23 and a CCD camera 24 are provided on the rear side of the display-side cabinet 2 as shown in FIG. 2.

Figure 4:
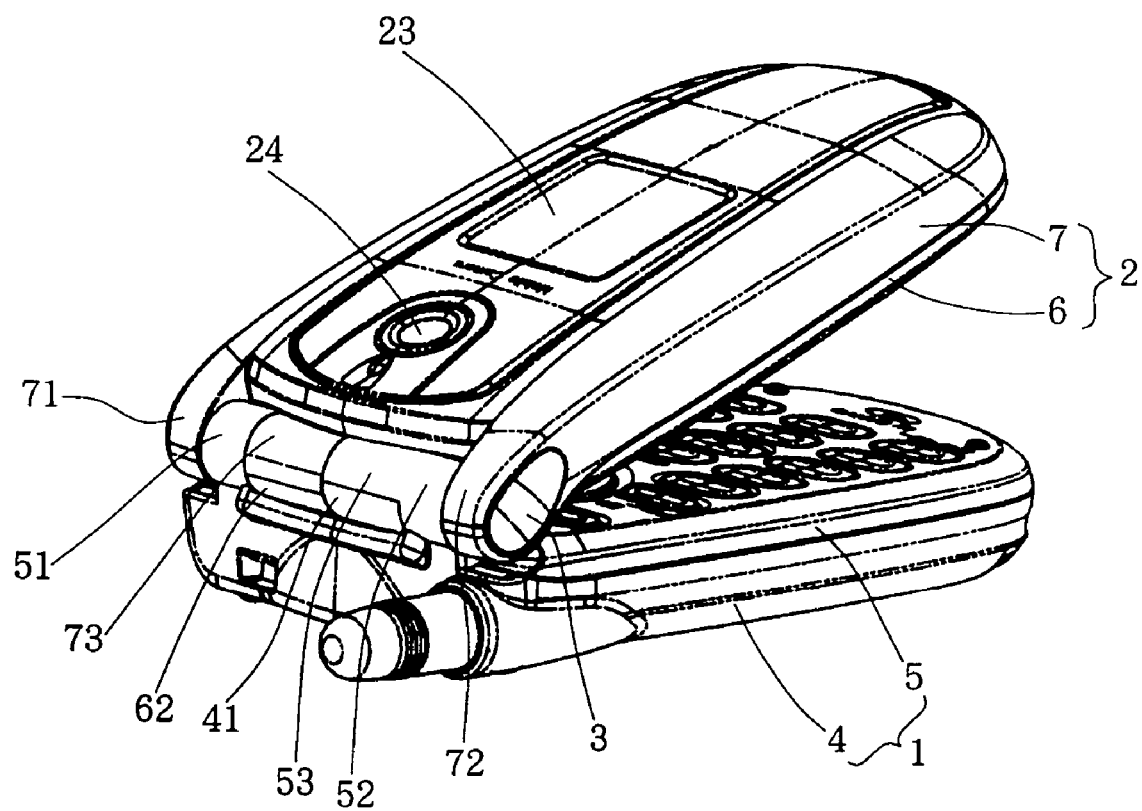
FIG. 4 is a perspective view of the telephone as it is seen from behind.
Figure 6:
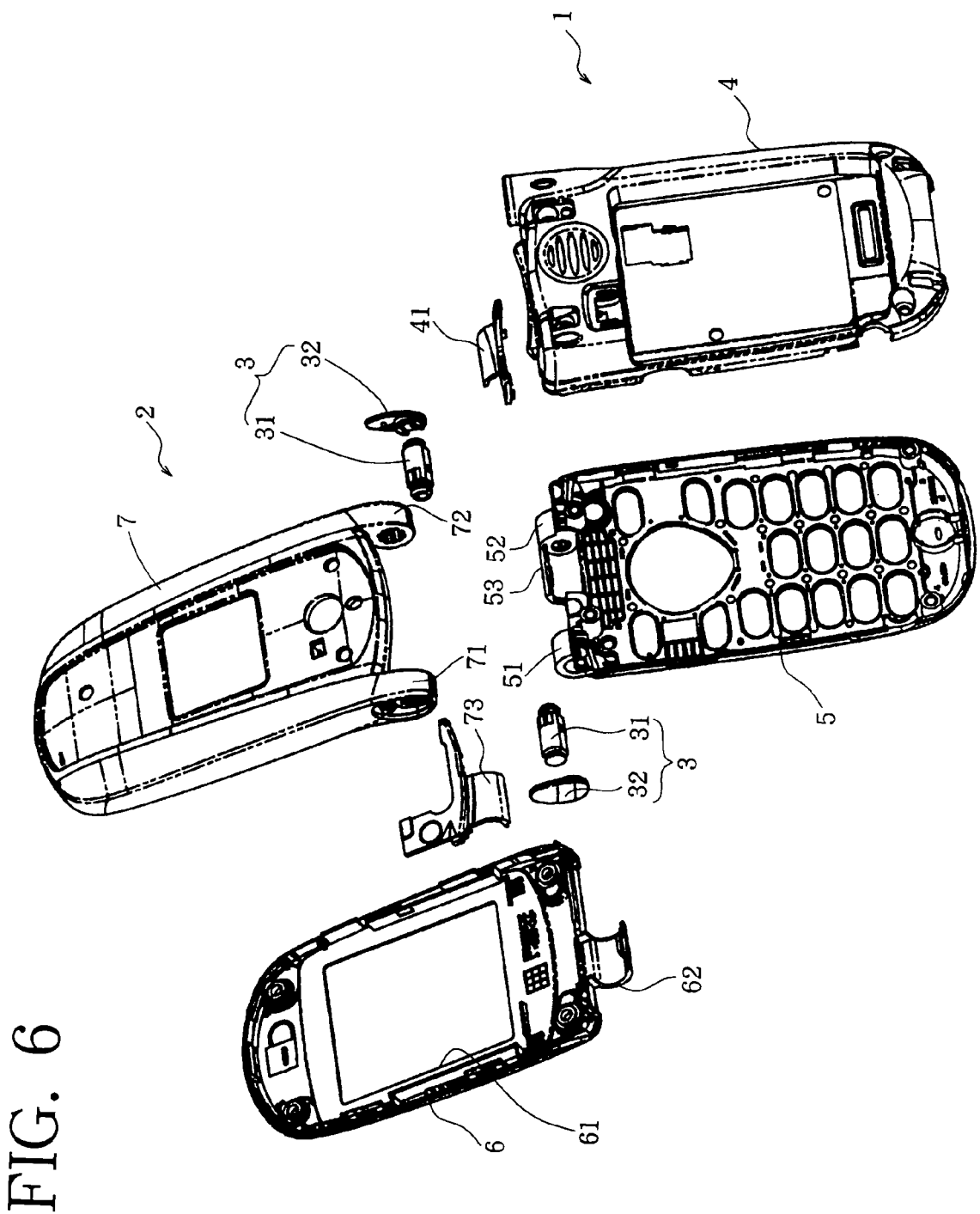
FIG. 6 is an exploded perspective view of the cabinets, having annular pieces for hinge units projecting from a front cabinet half segment of a manipulation-side cabinet and projecting from a rear cabinet half segment of a display-side cabinet.

With reference to FIGS. 4 and 6, the front cabinet segment 5 of the manipulation-side cabinet 1 is provided with an opposite pair of first annular piece 51 and second annular piece 52 projecting from one end thereof. The rear cabinet segment 7 of the display-side cabinet 2 is provided with an opposite pair of first annular piece 71 and second annular piece 72 projecting from one end thereof. As shown in FIG. 6, the hinge mechanism 3 comprises two hinge units 31 of known construction and a cover 32 attached to the outer end of each unit 31.

Figure 5:
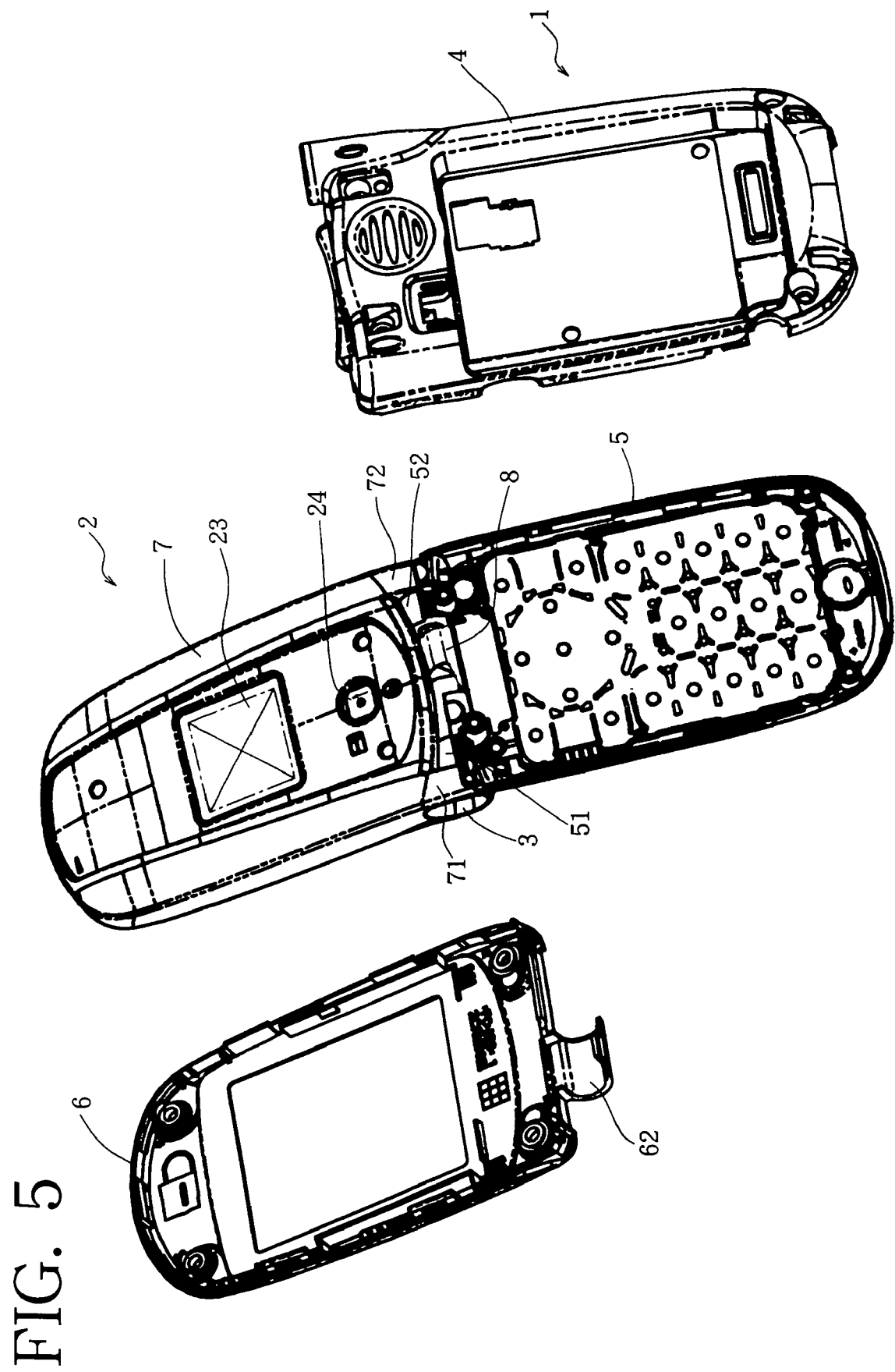
FIG. 5 is a perspective view of the telephone, with a rear cabinet half segment of a manipulation-side cabinet and a front cabinet half segment of a display-side cabinet separated therefrom.

With reference to FIG. 5, the first annular piece 51 of the manipulation-side cabinet 1 and the first annular piece 71 of the display-side cabinet 2 are arranged side by side in contact with each other and have fitted in the interior thereof one of the hinge units 31 providing the hinge mechanism 3. Further the second annular piece 52 of the manipulation-side cabinet 1 and the second annular piece 72 of the display-side cabinet 2 are arranged side by side in contact with each other and have fitted in the interior thereof the other hinge unit 31 providing the hinge mechanism 30.

Figure 3:
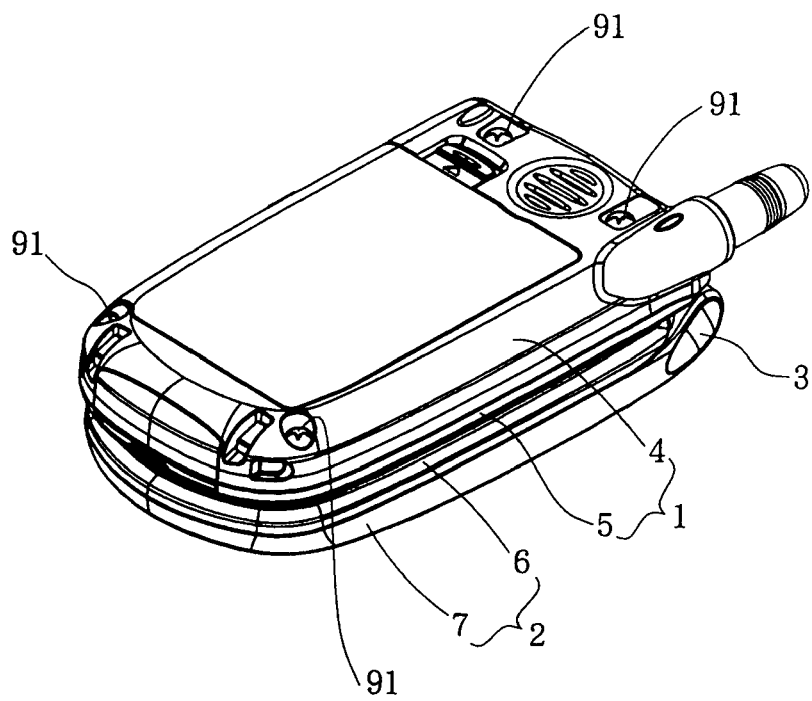
FIG. 3 is a perspective view showing the telephone in the same state as it is turned upside down.

The rear cabinet segment 4 of the manipulation-side cabinet 1 is engaged with the front cabinet segment 5 thereof and fastened to the segment 5 at four corners 91, 91, 91, 91 with screws driven in from the side of the rear cabinet segment 4 as seen in FIG. 3. The screws at the two locations 91, 91 closer to the hinge mechanism 3 will not interfere with the hinge mechanism 3 and are therefore positioned close to the hinge mechanism 3 to the greatest possible extent.

Further the front cabinet segment 6 of the display-side cabinet 2 is in engagement with the rear cabinet segment 7 thereof and fastened to the segment 7 at four corners 9, 9, 9, 9 with screws driven in from the side of the front cabinet segment 6 as seen in FIG. 1. The screws at the two locations 9, 9 closer to the hinge mechanism 3 are positioned a small distance away from the hinge mechanism 3 to avoid interference with the hinge mechanism 3.

Figure 7:
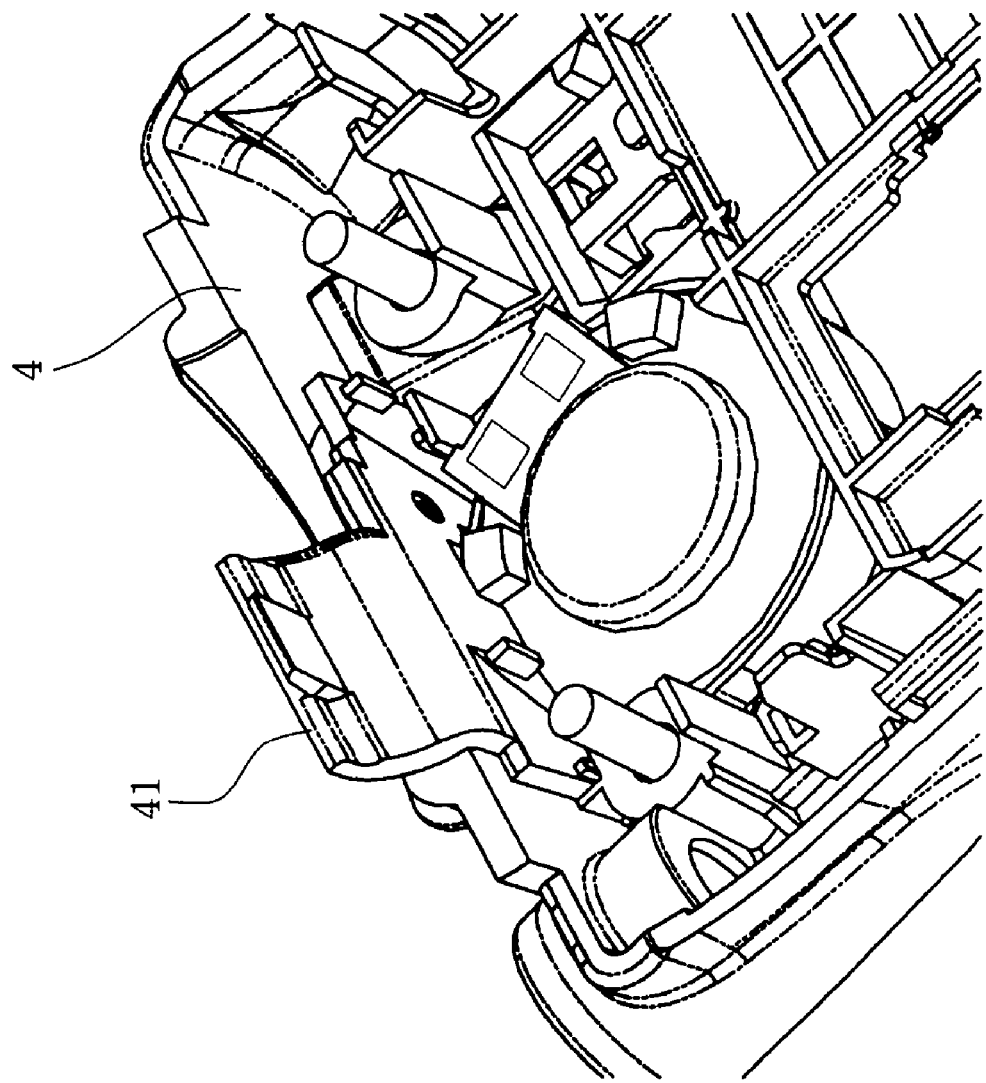
FIG. 7 is an enlarged perspective view of a partial member attached to the rear cabinet segment.

With reference to FIG. 6, the front cabinet segment 5 of the manipulation-side cabinet 1 has a circular-arc piece 53 projecting from the end thereof and positioned between the first and second annular pieces 51, 52, while the rear cabinet segment 4 is provided with a partial member 41 joined to the circular-arc piece 53 for forming a hollow cylinder (see FIG. 7).

The front cabinet segment 6 of the display-side cabinet 2 is provided with a projecting circular-arc piece 62 positioned in corresponding relation with a location between the first and second annular pieces 71, 72 of the rear cabinet segment 7, while the rear cabinet segment 7 is provided with a partial member 73 joined to the circular-arc piece 62 for forming a hollow cylinder.

Figure 6A:
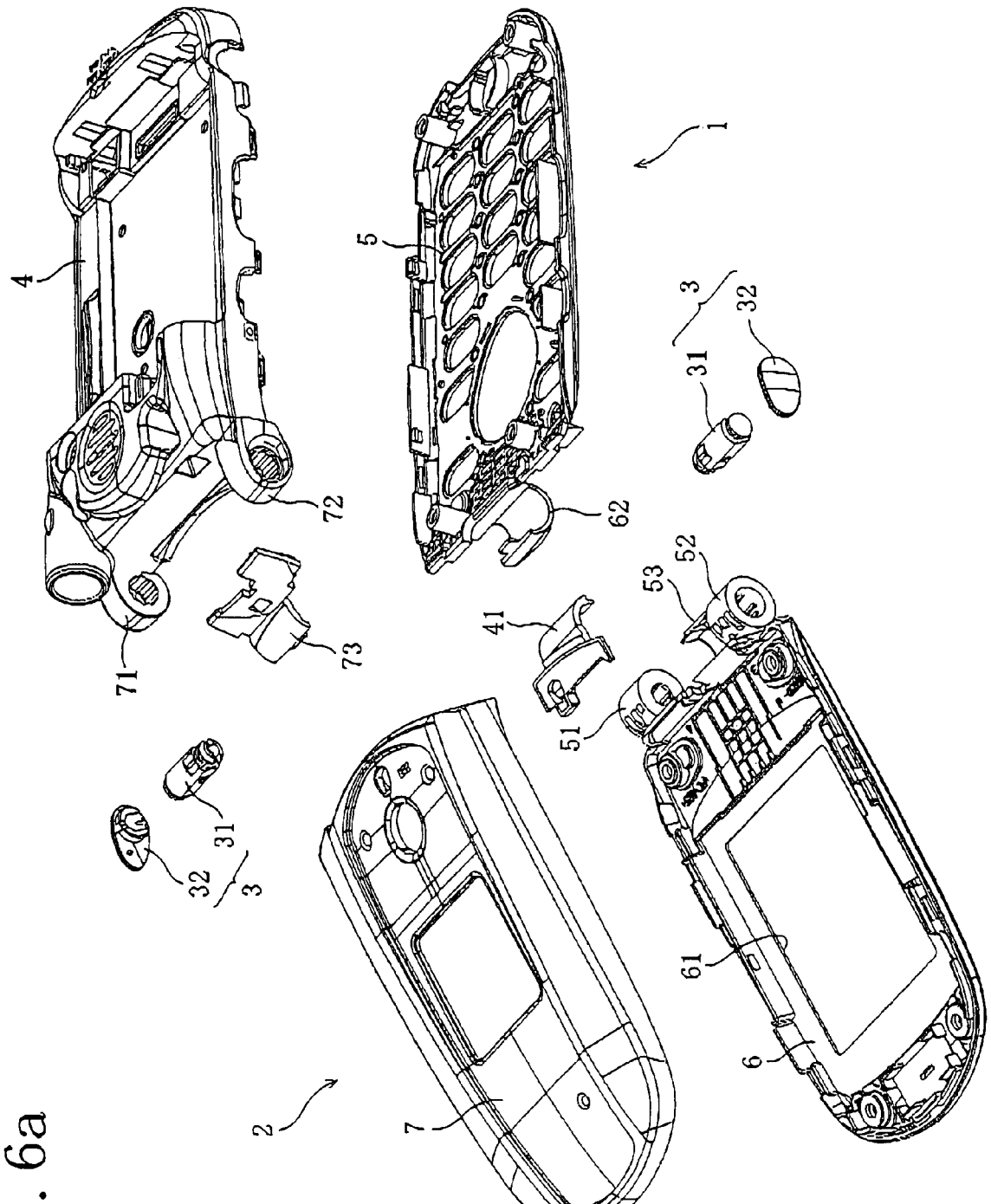
FIG. 6a is an exploded perspective view of the cabinets, having annular pieces for hinge units projecting from a rear cabinet half segment of a manipulation-side cabinet and projecting from a front cabinet half segment of a display-side cabinet.

In the portable terminal device of the foldable type shown in FIG. 6a, the front cabinet half segment 6 of the display-side cabinet 2 is provided with an opposite pair of first annular piece 51 and second annular piece 52 projecting from one end thereof. The rear cabinet half segment 4 of the manipulation-side cabinet 1 is provided with an opposite pair of first annular piece 71 and second annular piece 72 projecting from one end thereof. The hinge mechanism 3 comprises two hinge units 31 of known construction and a cover 32 attached to the outer end of each unit 31.

The first annular piece 51 of the display-side cabinet 2 and the first annular piece 71 of the manipulation-side cabinet are arranged side by side in contact with each other and have fitted in the interior thereof one of the hinge units 31 providing the hinge mechanism 3. Further, the second annular piece 52 of the display-side cabinet 2 and the second annular piece 72 of the manipulation-side cabinet 1 are arranged side by side in contact with each other and have fitted in the interior thereof the other hinge unit 31 providing the hinge mechanism 3.

The front cabinet half segment 6 of the display-side cabinet 2 has a circular-arc piece 53 projecting from the end thereof and positioned between the first and second annular pieces 51, 52, while the rear cabinet half segment 7 is provided with a partial member 41 joined to the circular-arc piece 53 for forming a hollow cylinder.

The front cabinet half segment 5 of the manipulation-side cabinet 1 is provided with a projecting circular-arc piece 62 positioned in corresponding relation with a location between the first and second annular pieces 71, 72 of the rear cabinet half segment 4, while the rear cabinet half segment 4 is provided with a partial member 73 joined to the circular-arc piece 62 forming a hollow cylinder.

A circuit board mounted on the front cabinet segment 5 of the manipulation cabinet 1 is electrically connected to the main display 21 and the subdisplay 23 which are mounted on the rear cabinet segment 7 of the display-side cabinet 2 by a flexible lead 8 shown in FIG. 5. The flexible lead 80 is helically wound inside the hollow cylinders provided between the first and second annular pieces 51, 52 on the front cabinet segment 5 on the manipulation side, whereby the flexible lead 8 is allowed to deform with the opening or closing of the manipulation-side cabinet 1 and display-side side cabinet 2.

With the telephone of the present invention, the hinge mechanism 3 is housed in the first and second annular members 71, 72 projecting from the rear cabinet segment 7 of the display-side cabinet 2 as shown in FIG. 4, and the front cabinet segment 6 is engaged with the rear cabinet segment 7. Accordingly, when the cabinets 1 and 2 are to be closed with extraneous matter held therebetween, the front cabinet segment 6 of the display-side cabinet 2 is free of a spreading force that would act to move the segment 6 away from the rear cabinet segment 7. Therefore, there is no likelihood that a clearance will be created at the joint between the segments 6, 7 of the display-side cabinet 2.

On the other hand, the rear cabinet segment 4 of the manipulation-side cabinet 1 is subjected to a spreading force acting to move the segment 4 away from the front cabinet segment 5. However, the rear cabinet segment 4 is fastened to the front cabinet segment 5 from outside the segment 4 with the screws at the positions 91, 91 which are in the closest proximity to the hinge mechanism 3. Since the two segments 4 and 5 are thus tightly joined to each other, no clearance will be formed by the spreading force at the joint.

With the portable telephone of the foldable type according to the invention, the partial member 41 is attached as a separate member to the rear cabinet segment 4 of the manipulation-side cabinet 1 as shown in FIG. 6. The rear cabinet segment 4 and the partial member 41 can therefore be given different colors. Because the partial member 73 is attached as a separate member to the rear cabinet segment 7 of the display-side cabinet 2, the segment 7 and the partial member 73 can be colored in different colors.

In the case where the front cabinet segments 5, 6 and the rear cabinet segments 4, 7 of the two cabinets 1, 2 are to be colored in different colors, the two partial members 41, 73 can be given the same color as the front cabinet segments 5, 6 to give the same color to the cylindrical portions between the first and second annular pieces 71, 72 projecting from the rear cabinet segment 7 of the display-side cabinet 2.

Figure 8:
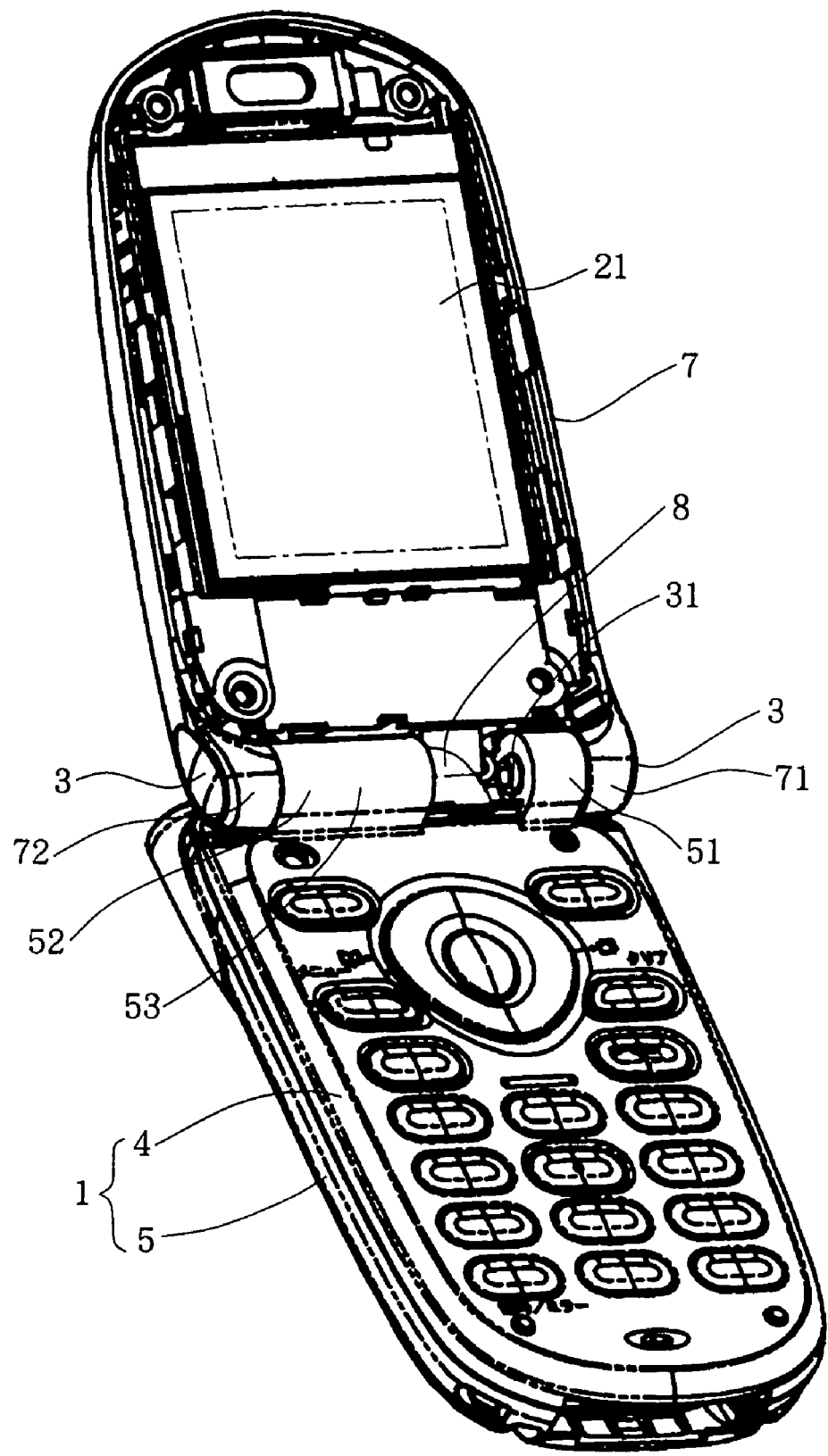
FIG. 8 is a perspective view showing the telephone, with the front cabinet segment of the display-side cabinet removed.
Figure 9:
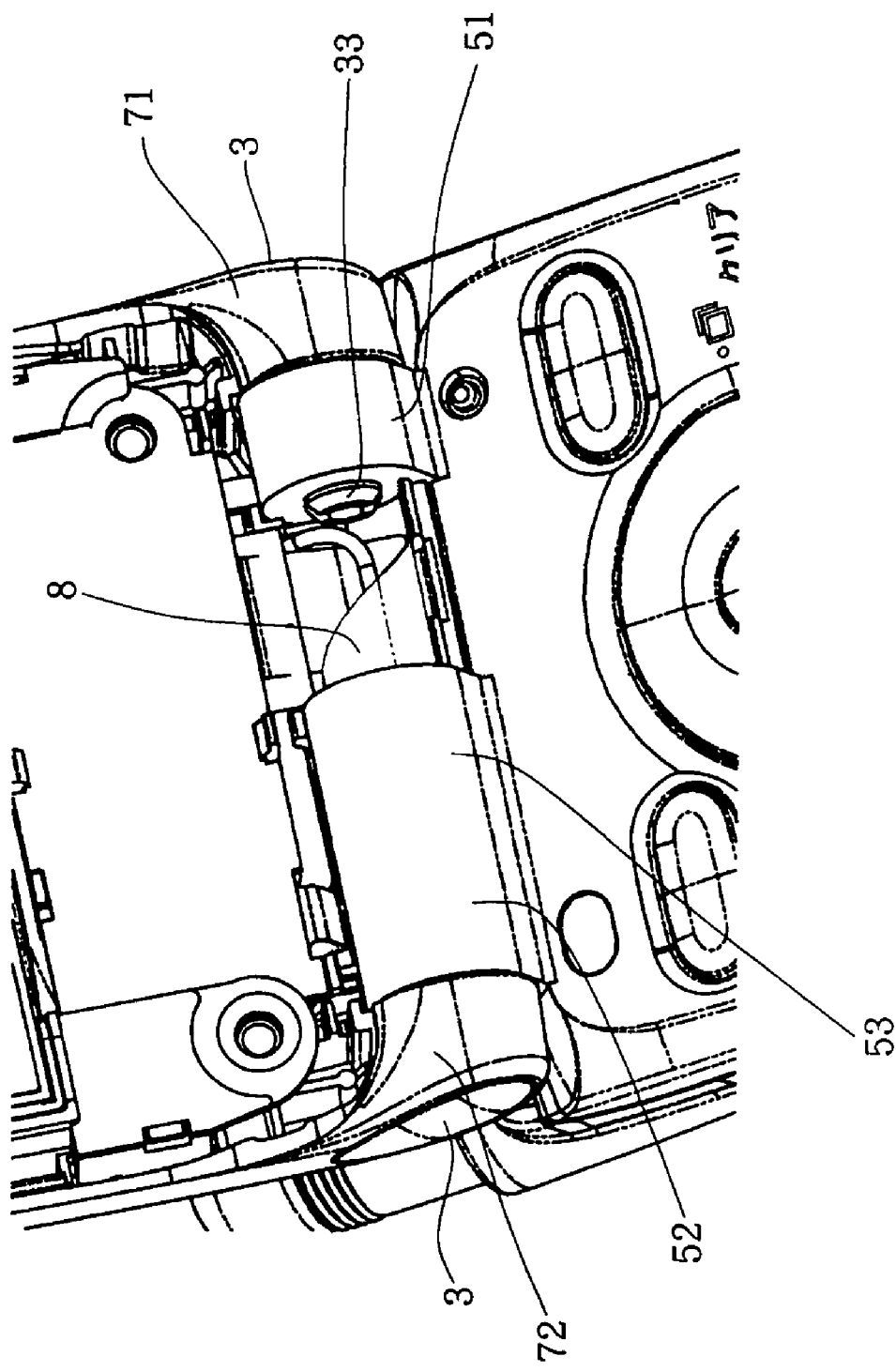
FIG. 9 is an enlarged fragmentary perspective view of FIG. 8.
Figure 10:
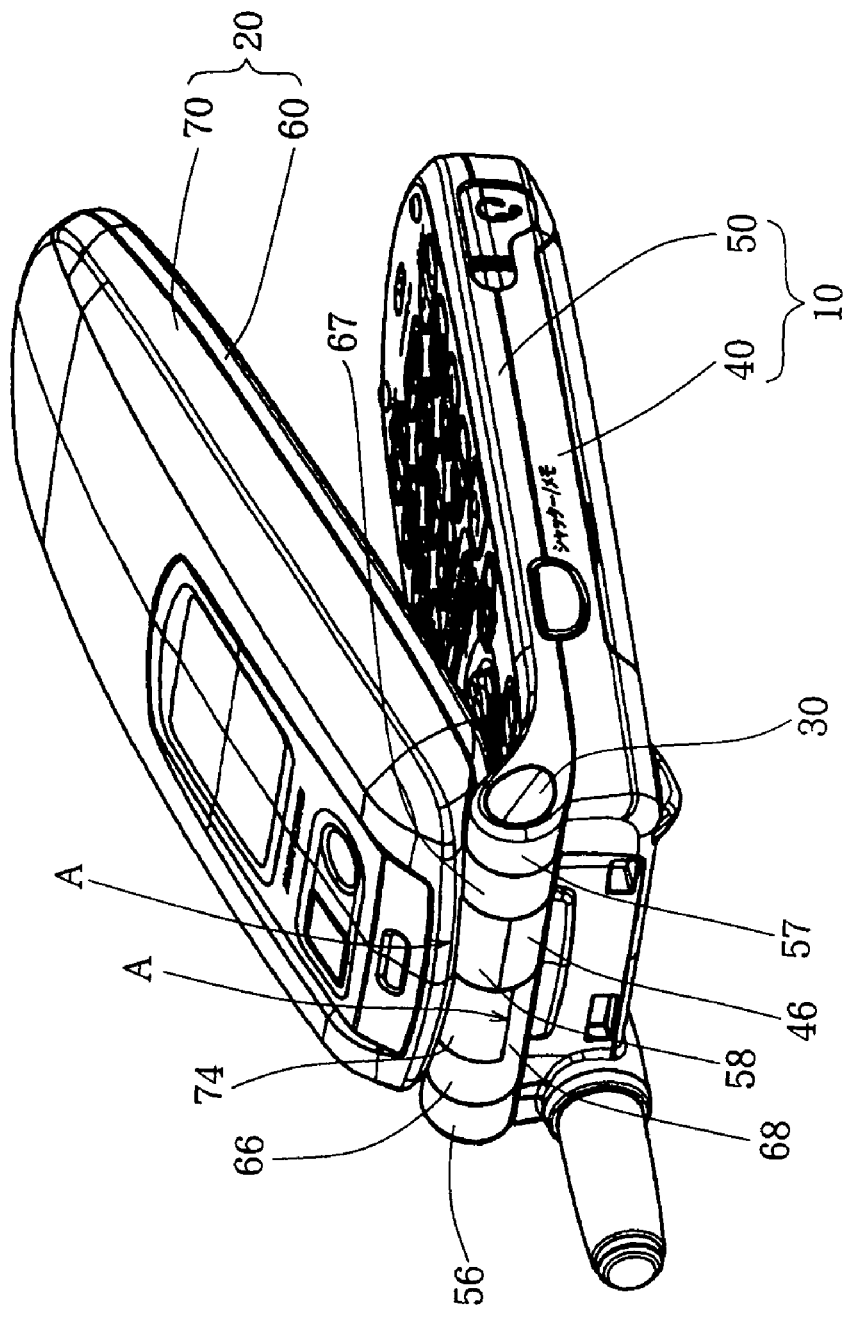
FIG. 10 is a perspective view showing a conventional portable telephone of the foldable type as it is seen from behind.
Figure 11:
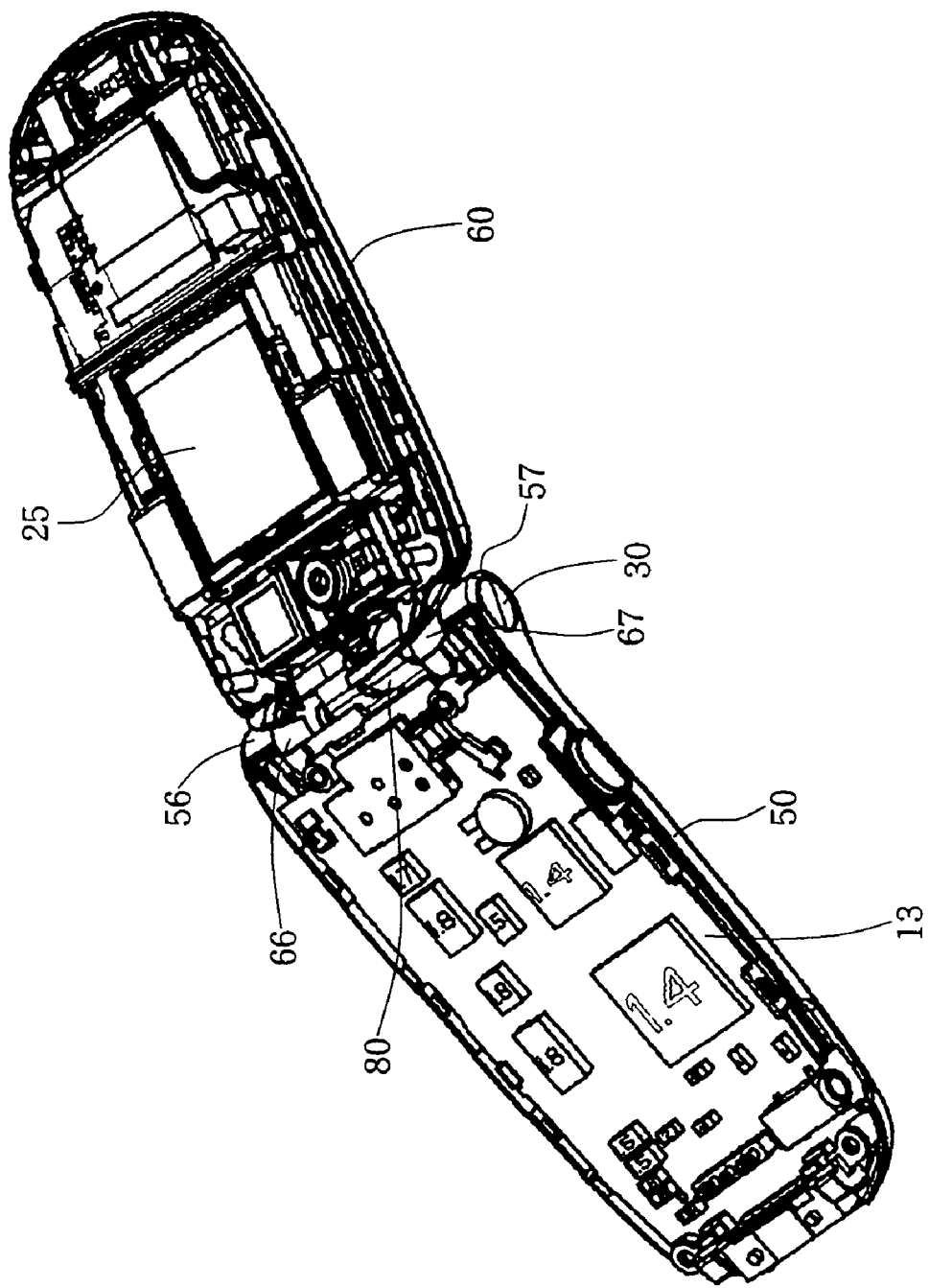
FIG. 11 is a perspective view of the telephone, with the rear cabinet half segments removed from manipulation-side and display-side cabinets.
Figure 12:
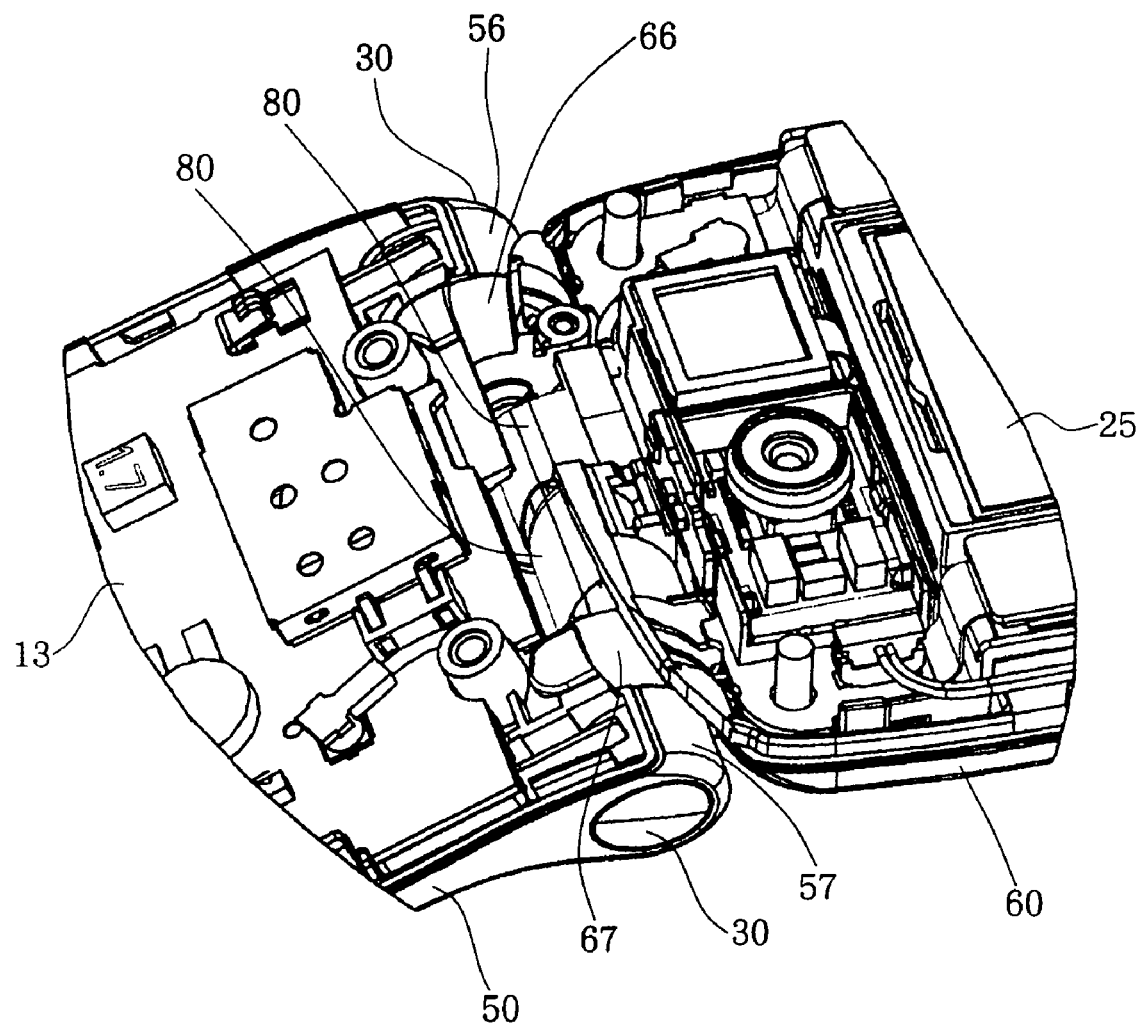
FIG. 12 is an enlarged fragmentary perspective view of FIG. 11.

Further when a need arises to remove the hinge mechanism 3 from the telephone described above for maintenance, the front cabinet segment 6 is removed from the display-side cabinet 2, whereby the flexible lead 8 is exposed between the first annular piece 51 and the circular-arc piece 53 provided on the manipulation-side front cabinet segment 5 as shown in FIG. 8. Since the flexible lead 8 is helically wound along the inner periphery of the display-side partial member 73 as shown in FIG. 9, the inner end 33 of the hinge unit 31 inserted through the first annular pieces 51, 71 becomes exposed without being covered with the flexible lead 8.

Accordingly, the inner end 33 of the hinge unit 31 can be pushed outward with a removing jig without being interfered with by the flexible lead 8, whereby the hinge unit 31 is easily removable without removing the display or circuit board.

The device of the present invention is not limited to the foregoing embodiment in construction but can be modified variously by one skilled in the art without departing from the spirit of the invention as set forth in the appended claims.

What is claimed is:

1. A portable terminal device of the foldable type comprising a pair of flat cabinets openably connected to each other by a hinge mechanism, each of the cabinets comprising a front cabinet half segment to be opposed to the other cabinet when closed and a rear cabinet half segment joined to the front cabinet half segment, said front cabinet half segment being a separate piece from said rear cabinet half segment, one of the pair of cabinets having the front cabinet half segment thereof connected at an end portion thereof to the hinge mechanism and having the rear cabinet half segment thereof engaged with the front cabinet half segment thereof, the other cabinet having the rear cabinet half segment thereof connected at an end portion thereof to the hinge mechanism and having the front cabinet half segment thereof engaged with the rear cabinet half segment thereof, such that when the pair of cabinets are closed, with extraneous matter therebetween, no clearance is created in the joint between the front cabinet half segment and rear cabinet half segment of either of the pair of cabinets, wherein the front cabinet half segment of the manipulation-side cabinet is provided with a pair of annular pieces projecting from one end thereof and spaced apart from each other, and the rear cabinet half segment of the display-side cabinet is provided with a pair of annular pieces projecting from one end thereof and spaced apart from each other, the annular piece of the manipulation-side cabinet and the annular piece of the display-side cabinet being arranged side by side in contact with each other and having fitted therein a first hinge unit, the other annular piece of the manipulation-side cabinet and the other annular piece of the display-side cabinet being arranged side by side in contact with each other and having fitted therein a second hinge unit, and the front cabinet half segment of the manipulation-side cabinet has a circular-arc piece projecting from the end thereof and positioned between the pair of annular pieces, and the rear cabinet half segment of the manipulation-side cabinet is provided at one end thereof with a partial member joined to the circular-arc piece for forming a hollow cylinder.

2. A portable terminal device of the foldable type according to claim 1 wherein a circuit board in the manipulation-side cabinet and a display in the display-side cabinet are connected to each other by a flexible lead, and the flexible lead is helically wound inside the hollow cylinder formed by the circular-arc piece and the partial member.

3. A portable terminal device of the foldable type comprising a pair of flat cabinets openably connected to each other by a hinge mechanism, each of the cabinets comprising a front cabinet half segment to be opposed to the other cabinet when closed and a rear cabinet half segment joined to the front cabinet half segment, said front cabinet half segment being a separate piece from said rear cabinet half segment, one of the pair of cabinets having the front cabinet half segment thereof connected at an end portion thereof to the hinge mechanism and having the rear cabinet half segment thereof engaged with the front cabinet half segment thereof, the other cabinet having the rear cabinet half segment thereof connected at an end portion thereof to the hinge mechanism and having the front cabinet half segment thereof engaged with the rear cabinet half segment thereof, such that when the pair of cabinets are closed, with extraneous matter therebetween, no clearance is created in the joint between the front cabinet half segment and rear cabinet half segment of either of the pair of cabinets, wherein the front cabinet half segment of the manipulation-side cabinet is provided with a pair of annular pieces projecting from one end thereof and spaced apart from each other, and the rear cabinet half segment of the display-side cabinet is provided with a pair of annular pieces projecting from one end thereof and spaced apart from each other, the annular piece of the manipulation-side cabinet and the annular piece of the display-side cabinet being arranged side by side in contact with each other and having fitted therein a first hinge unit, the other annular piece of the manipulation-side cabinet and the other annular piece of the display-side cabinet being arranged side by side in contact with each other and having fitted therein a second hinge unit, and the front cabinet half segment of the display-side cabinet is provided with a projecting circular-arc piece positioned between the pair of annular pieces, and the rear cabinet half segment of the display-side cabinet is provided at the end thereof with a partial member joined to the circular-arc piece for forming a hollow cylinder.

4. A portable terminal device of the foldable type according to claim 3 wherein a circuit board in the manipulation-side cabinet and a display in the display-side cabinet are connected to each other by a flexible lead, and the flexible lead is helically wound inside the hollow cylinder formed by the circular-arc piece and the partial member.

* * * * *